US010925005B2

(12) United States Patent
Davydov et al.

(10) Patent No.: US 10,925,005 B2
(45) Date of Patent: Feb. 16, 2021

(54) UPLINK POWER CONTROL FOR 5G SYSTEMS

(71) Applicant: APPLE INC., Cupertino, CA (US)

(72) Inventors: Alexei Davydov, Nizhny Novgorod (RU); Hyejung Jung, Palatine, IL (US); Gregory Morozov, Nizhny Novgorod (RU); Victor Sergeev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 16/079,494

(22) PCT Filed: Mar. 23, 2017

(86) PCT No.: PCT/US2017/023845
§ 371 (c)(1),
(2) Date: Aug. 23, 2018

(87) PCT Pub. No.: WO2017/165668
PCT Pub. Date: Sep. 28, 2017

(65) Prior Publication Data
US 2019/0373559 A1 Dec. 5, 2019

Related U.S. Application Data

(60) Provisional application No. 62/313,565, filed on Mar. 25, 2016.

(51) Int. Cl.
*H04W 52/14* (2009.01)
*H04W 52/42* (2009.01)
*H04W 52/58* (2009.01)

(52) U.S. Cl.
CPC ......... *H04W 52/146* (2013.01); *H04W 52/42* (2013.01); *H04W 52/58* (2013.01)

(58) Field of Classification Search
CPC .... H04W 52/146; H04W 52/42; H04W 52/58
See application file for complete search history.

(56) References Cited

U.S. PATENT DOCUMENTS 7,120,199 B2 * 10/2006 Thielecke ............ H04B 7/0417
375/267
7,778,342 B2 * 8/2010 Larsson ................ H04L 1/0015
375/267

(Continued)

FOREIGN PATENT DOCUMENTS

EP          2309807 A2    4/2011
WO       2010107885 A2    9/2010

OTHER PUBLICATIONS

International Patent Office—International Search Report and Written Opinion dated May 16, 2017 from International Application No. PCT/US2017/023845, 16 pages.

(Continued)

*Primary Examiner* — Jenee Holland
(74) *Attorney, Agent, or Firm* — Fay Kaplun & Marcin, LLP

(57) ABSTRACT

This disclosure proposes to use multiple power control loops in the uplink. Each power control loop may be associated with a respective antenna beam transmitted from an antenna array of the electronic device (e.g. UE) in the uplink. For example, a beam (or uplink signal) may be associated with 1, 2 or even more MIMO layer. Hence, in this latter case, each power control loop may be associated with a respective set of one or more MIMO layers. This concept is application to open-loop, closed-loop power control or both.

18 Claims, 9 Drawing Sheets

(56) References Cited

U.S. PATENT DOCUMENTS

| | | | | |
|---|---|---|---|---|
| 2007/0104164 A1* | 5/2007 | Laroia | H04B 17/345 | 370/338 |
| 2008/0080364 A1* | 4/2008 | Barak | H04L 1/06 | 370/210 |
| 2008/0240031 A1* | 10/2008 | Nassiri-Toussi | H04L 25/0204 | 370/329 |
| 2010/0068993 A1* | 3/2010 | Khan | H04B 7/1853 | 455/12.1 |
| 2010/0074237 A1* | 3/2010 | Ahn | H04W 52/42 | 370/338 |
| 2010/0118805 A1* | 5/2010 | Ishii | H04W 52/367 | 370/329 |
| 2010/0246705 A1* | 9/2010 | Shin | H04W 52/146 | 375/267 |
| 2010/0285830 A1* | 11/2010 | Englund | H04W 52/146 | 455/522 |
| 2011/0075594 A1* | 3/2011 | Burstrom | H04W 52/10 | 370/280 |
| 2011/0080893 A1* | 4/2011 | Fong | H04W 36/0055 | 370/331 |
| 2011/0081935 A1* | 4/2011 | Yeon | H04W 52/346 | 455/522 |
| 2011/0103498 A1* | 5/2011 | Chen | H04L 1/06 | 375/260 |
| 2011/0201376 A1* | 8/2011 | Hu | H04W 52/42 | 455/522 |
| 2011/0249590 A1* | 10/2011 | Blankenship | H04B 7/0456 | 370/252 |
| 2011/0255619 A1* | 10/2011 | Nam | H04L 1/0031 | 375/260 |
| 2011/0280146 A1* | 11/2011 | Tidestav | H04B 1/7103 | 370/252 |
| 2011/0281612 A1* | 11/2011 | Ishii | H04W 52/146 | 455/522 |
| 2011/0310987 A1* | 12/2011 | Lee | H04W 52/146 | 375/259 |
| 2012/0087324 A1* | 4/2012 | Kiyoshima | H04W 52/146 | 370/329 |
| 2012/0115531 A1* | 5/2012 | Gaal | H04B 7/04 | 455/522 |
| 2012/0142334 A1* | 6/2012 | Sato | H04W 52/244 | 455/422.1 |
| 2012/0195264 A1* | 8/2012 | Taoka | H04B 7/0639 | 370/328 |
| 2012/0208589 A1* | 8/2012 | Kiyoshima | H04W 52/242 | 455/522 |
| 2012/0320862 A1* | 12/2012 | Ko | H04B 7/0417 | 370/329 |
| 2013/0029657 A1* | 1/2013 | Gao | H04W 74/004 | 455/422.1 |
| 2013/0094380 A1* | 4/2013 | Taoka | H04B 7/0417 | 370/252 |
| 2013/0121185 A1* | 5/2013 | Li | H04W 24/10 | 370/252 |
| 2013/0121342 A1* | 5/2013 | Kim | H04B 7/0617 | 370/436 |
| 2013/0142113 A1* | 6/2013 | Fong | H04L 5/0053 | 370/328 |
| 2013/0194931 A1* | 8/2013 | Lee | H04L 5/0053 | 370/241 |
| 2013/0287132 A1* | 10/2013 | Taoka | H04B 7/0452 | 375/267 |
| 2013/0301455 A1* | 11/2013 | Jung | H04W 72/0406 | 370/252 |
| 2013/0322375 A1* | 12/2013 | Chang | H04W 36/00835 | 370/329 |
| 2014/0161093 A1* | 6/2014 | Hoshino | H04B 7/024 | 370/329 |
| 2014/0179363 A1* | 6/2014 | Nishikawa | H04L 27/2614 | 455/522 |
| 2014/0185481 A1* | 7/2014 | Seol | H04W 52/24 | 370/252 |
| 2014/0342768 A1* | 11/2014 | Soldati | H04B 7/024 | 455/522 |
| 2015/0020157 A1* | 1/2015 | Kim | H04W 36/18 | 726/3 |
| 2015/0351050 A1* | 12/2015 | Takahashi | H04W 16/32 | 455/522 |
| 2015/0373648 A1* | 12/2015 | Yang | H04W 52/10 | 455/522 |
| 2019/0075526 A1* | 3/2019 | Nagaraj | H04B 7/0408 | |

OTHER PUBLICATIONS

Huawei, "Uplink Multi-Antenna Power Control," 3GPP TSG RAN WG1 meeting #60bis, R1-101949, Agenda Item: 6.2.5.5, , Apr. 12-16, 2010, Beijing, China, 4 pages.

3GPP, "Technical Specification Group Radio Access Network; Evolved Universal Terrestrial Radio Access (E-UTRA); Physical layer procedures (Release 13)," 3GPP TS 36.213 V13.0.1 (Jan. 2016), Jan. 27, 2016, Lte Advanced Pro, 326 pages (IDF).

* cited by examiner

UPLINK POWER CONTROL FOR 5G SYSTEMS

CROSS-REFERENCE TO RELATED APPLICATIONS

The present application is a national phase entry under 35 U.S.C. § 371 of International Application No. PCT/US2017/023845, filed Mar. 23, 2017, entitled "UPLINK POWER CONTROL FOR 5G SYSTEMS", which designates the United States of America, which claims priority to U.S. Provisional Patent Application No. 62/313,565, filed Mar. 25, 2016, entitled "UPLINK POWER CONTROL FOR 5G SYSTEMS," the entire disclosures of which are hereby incorporated by reference herein their entireties for all purposes.

FIELD

This disclosure relates to the uplink power control in mobile communication systems. Embodiments allow the use of different power control loops for uplink (UL) transmit power control (TPC), which may be associated with respective beams and/or multiple input multiple output (MIMO) layers.

BACKGROUND 4G mobile communication networks standardized by the $3^{rd}$ Generation Partnership Project (3GPP), such as 3GPP for LTE (Long Term Evolution) networks (Releases 11 to 13) allow for Coordinated MultiPoint (CoMP) transmissions to improve network performance at cell edges. In CoMP a number of TX (transmit) points provide coordinated transmission in the downlink (DL), and a number of RX (receive) points provide coordinated reception in the uplink (UL). A TX/RX-point constitutes of a set of co-located TX/RX antennas providing coverage in the same sector. The set of TX/RX-points used in CoMP can either be at different locations, or co-sited but providing coverage in different sectors, they can also belong to the same or different evolved Node Bs (eNBs).

Basically, two types of uplink CoMP are typically considered in 3GPP LTE-based networks: joint reception and processing, and coordinated scheduling. The coordinated scheduling scheme operates by coordinating the uplink scheduling decisions among the coordinating nodes (e.g. eNBs) to minimize the interference. The joint reception scheme is a more advanced coordination scheme and relies on multiple antenna processing techniques at different nodes to reduce or cancel interference. By coordinating the reception points, it is possible to form a virtual antenna array and the signals received by the nodes can be jointly combined and processed in the optimal manner.

BRIEF DESCRIPTION OF THE FIGURES

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

DETAILED DESCRIPTION

Some embodiments disclosed herein are related to uplink power control in 4G or 5G systems and may include uplink CoMP operation.

In 5G ($5^{th}$ generation) systems, the uplink CoMP operation may be extended to support transmission of different MIMO layers to the two or more reception points. Each MIMO layer may be differently beamformed to optimize the transmission to the corresponding reception point and minimize the interference between the transmitted uplink MIMO layers. In the considered schemes, due to reduced interference between MIMO layers, each reception point may locally process the received MIMO layers designated to the particular node without involving joint processing with other node. In this case the synchronization between the reception points and backhaul link signaling capacity requirement can be significantly relaxed.

Figure 1:
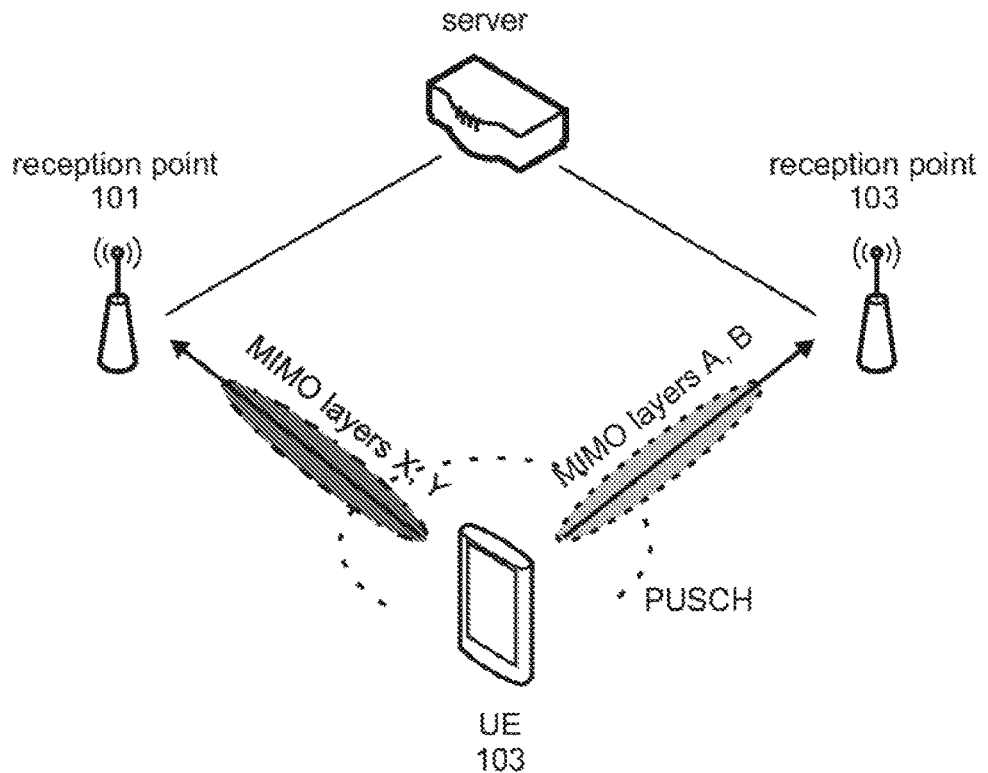
FIG. 1 shows an exemplary CoMP scenario in which a user equipment (UE) uses beamforming to stir two antenna beams, each transmitting a subset of MIMO layers, to two reception points.

FIG. 1 illustrates the possible transmission example for the uplink CoMP in a mobile communication system, which may be a 4G or 5G system. A shown in FIG. 1, a user equipment (UE 103) has a transmission scheduled in the uplink for two reception points 101, 102 (e.g. a base station (eNB, gNB, etc.), relay node, etc.). The transmission allow for implementing a Single User MIMO (SU-MIMO) scheme, and the UE 103 is exemplarily assumed to send MIMO layers X and Y to the first reception point 101 and MIMO layers A and B to the second reception point 102. The UE 103 may have an antenna array and use beamforming to steer the data streams corresponding to the MIMO layers, respectively, in different directions (links) for reception by the two reception points 101, 102. The transmissions may be mapped to a shared channel in the uplink (e.g. Physical Uplink Shared Channel (PUSCH)) within the uplink subframe structure.

Note that the two reception points 101, 102 may also be (physically) the same entity, i.e. form a "single" reception point in terms of its structural implementation. Hence, the reference to multiple "reception point" may refer to reception of a given beam at an entity at some location. In some scenarios the beams corresponding to different MIMO layers may be stirred by the transmitting UE 103 to have different propagation paths and the respective beams may be received at respective reception points, which may correspond to one or more physical entities (locations).

Figure 2:
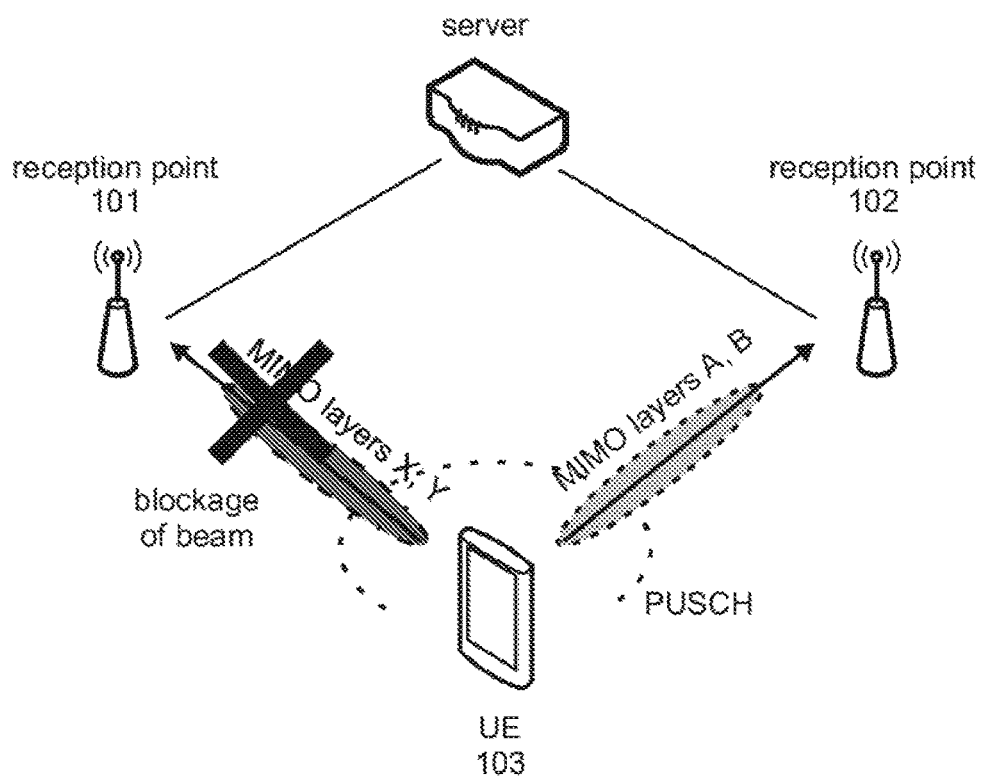
FIG. 2 shows an example blocking scenario in the CoMP example of FIG. 1.
Figure 3:
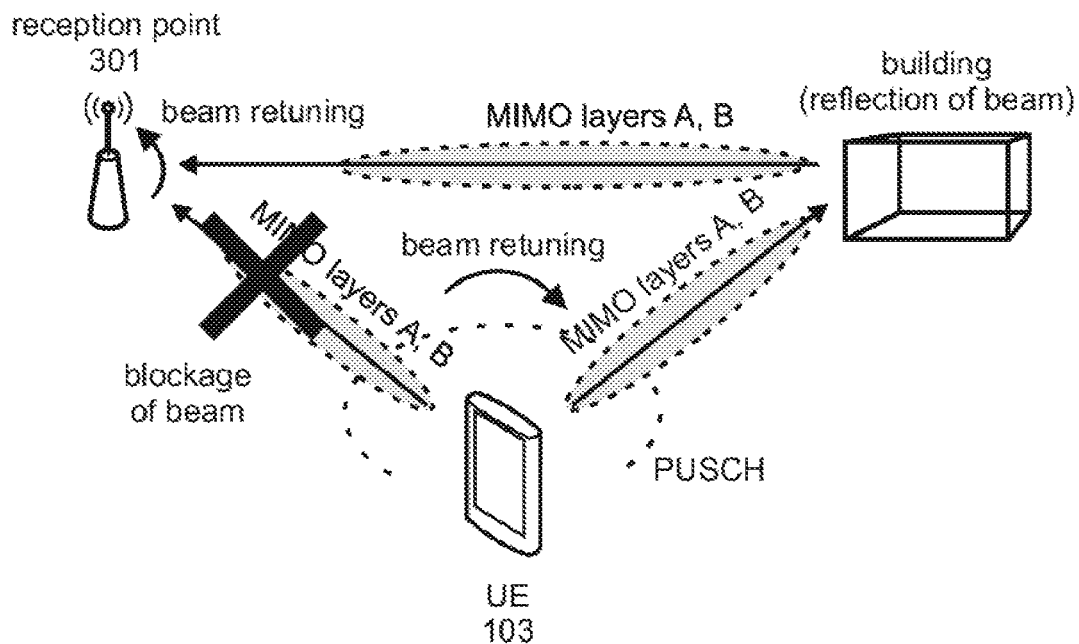
FIG. 3 shows exemplary beam retuning by a UE in response to blockage of the original propagation path of the beam.

In high frequency bands, the effect of propagation link blockage may occur due to moving objects in the propagation environment such as buildings, humans or cars. A blockage scenario is exemplified in FIG. 2, where it is assumed for exemplary purposes that the direct link (sometimes also referred to as a propagation path) between a UE 103 and a reception point 101 is blocked. The blockage of the propagation link may results into noticeable variation of the propagation loss corresponding to the reception point 101 and possibly fast Tx/Rx (transmitter/receiver) beamforming retuning at the reception point and the UE 103. A fast retuning by means of beamforming is exemplified in FIG. 3, where the UE 103 adjusts its beamforming of the antenna beam carrying MIMO layers A, B transmitted in response to blockage on the initial propagation path to a reception point 301.

Due to fast variation of the propagation loss and fast selection of the propagation link by Tx/Rx the power control mechanism should support mechanism of fast power control adjustments, which may not exist in legacy LTE systems.

Open loop power control (OLPC) may be performed by the UE without dynamic signaling from the network. The purpose of the OLPC is to compensate for long-term channel variations such as pathloss attenuation and shadowing fading. Closed loop power control (CLPC) may provide more tight control on UE transmit power using dynamic signaling. 3GPP TS (technical specification) 36.213, version 13.0.1 (January 2016), specifies a CLPC to control power around the power determined by the UE from OLPC procedures (see section 5 of 3GPP TS 36.213 for details). In accordance to the eNB signaling the UE tries to adjust its transmit power such that the transmission power per Resource Block (RB) remains constant independently of the allocated transmission bandwidth. In other words, as long as there is no DCI (Downlink Control Information) signaling from the eNB on the Physical Downlink Control Channel (PDCCH) or Enhanced Physical Downlink Control Channel (EPDCCH), the UE autonomously performs OLPC based on pathloss (PL) estimation from the reference signals, broadcasted system parameters and dedicated signaling.

When the UE receives a power control command in a DCI (for example, DCI Format 0, 1, 1A, 1B, 1D, 2, 2A, 2C, 2D, 3, 3A of 4 as specified in 3GPP TS 36.212, version 13.0.0 (December 2015)), the UE adjusts its transmit power.

The closed-loop power control is supported for transmissions on PUSCH (Physical Uplink Shared CHannel) and PUCCH (Physical Uplink Control CHannel), and SRS (Sounding Reference Signal) in the uplink on non-CoMP scenarios. For power control on PUSCH, the transmit power P can be set by the UE according to the following equation:

$$P_{PUSCH} = \min(P_{max}, 10\log_{10} M + P_0 + \alpha \cdot PL + \Delta_{TF} + \Delta_i) \text{ [dBm]} \quad \text{(Equation 1)}$$

where $P_{max}$ is the maximum allowed UE transmit power (e.g. 23 dBm), M is the bandwidth of the PUSCH resource assignment in PRBs (number of Physical Resource Blocks (PRBs) allocated to the UE), $P_0$ is a UE-specific power offset, $\alpha=\{0, 0.4, 0.5, 0.6, 0.7, 0.8, 0.9, 1\}$ is the degree of pathloss compensation (cell specific), PL is the estimated pathloss, $\Delta_{TF}$ is transport dependent offset for various modulation and coding schemes, and $\Delta_i$ is a closed loop power correction. The pathloss PL may be calculated from filtered Reference Signal Received Power (RSRP) measurements using CRS (Cell-specific Reference Signal) and "Reference Signal Power" signaled in an information element (IE) of SIB2 (System Information Block 2). Note that the above equation is only exemplary and assumes—for sake of the example only—no parallel transmission on PUCCH in the subframe carrying the PUSCH for which the transmit power $P_{PUSCH}$ is determined.

For open-loop power control, Equation (1) can be simplified to include only the open-loop terms:

$$P_{PUSCH} = \min(P_{max}, 10\log_{10} M + P_0 + \alpha \cdot PL) \text{ [dBm]} \quad \text{(Equation 2)}$$

In a closed-loop power control scheme, the power control commands $\Delta_i$ are sent directly by the eNB to change the UE output power dynamically. The special command being used for power control is called TPC (Transmit Power Control) command, which may be transmitted using for example the DCI Formats 0/4. The TPC command affects overall transmit power of the UE, and thus transmitted power available for all MIMO layers.

In embodiments of this disclosure, enhancements to uplink power control scheme are proposed. Those enhancements may be for example used in 4G or 5G systems. According to one aspect of this disclosure, it is proposed to use multiple power control loops in the uplink. Each power control loop may be associated with a respective antenna beam transmitted from an antenna array of the electronic device (e.g. UE) in the uplink. For example, a beam (or uplink signal) may be associated with 1, 2 or even more MIMO layer. Hence, in this latter case, each power control loop may be associated with a respective set of one or more MIMO layers.

This concept is application to open-loop as well as closed-loop power control. If both power control schemes are utilized in a mobile communication system, the concept may be implemented for both, the open-loop power control process and the closed-loop power control process. In this latter case, the subsets of MIMO layers associated to the different power control loops may be the same for open-loop power control and closed-loop power control. For open-loop power control, signaling of the two or more uplink power control parameters including parameters of the reference signals that should be used for the pathloss measurements and transmit power calculation may be utilized. One or more reference signals can be associated with the subset of the uplink MIMO layers (or a power control loop and its associated parameter set).

For closed-loop power control, two or more power control loops can be utilized for two or more subsets of MIMO layers. Each loop can indicate the power adjustments for the subsets of the associated uplink MIMO layers transmitted by the electronic device. In another embodiment, an indication of the power control set—including parameters for the power control loop—is provided in the DCI to provide dynamic information on the selected set of the parameters that should be used for uplink data transmission.

As noted, the disclosed concepts allow for using individual power control loops for the transmissions of signals/beams from an electronic device to one or more reception points. For example, when using the concept in a CoMP scenario, the electronic device may send different uplinks signals (each being associated with a subset of MIMO layers) to different reception nodes (e.g. base stations, such as eNB and gNB), and may control the transmit power for each of these signal separately using a separate transmit power control loop. The different power control loops may be configured with different power control sets, and/or may use different reference signals in the downlink for pathloss estimation. However, this concept is not limited to a CoMP scenario only. It is also possible that the electronic device performs different beamforming for the different subsets of MIMO layers, and power control is performed for each beamformed uplink signal.

Figure 4:
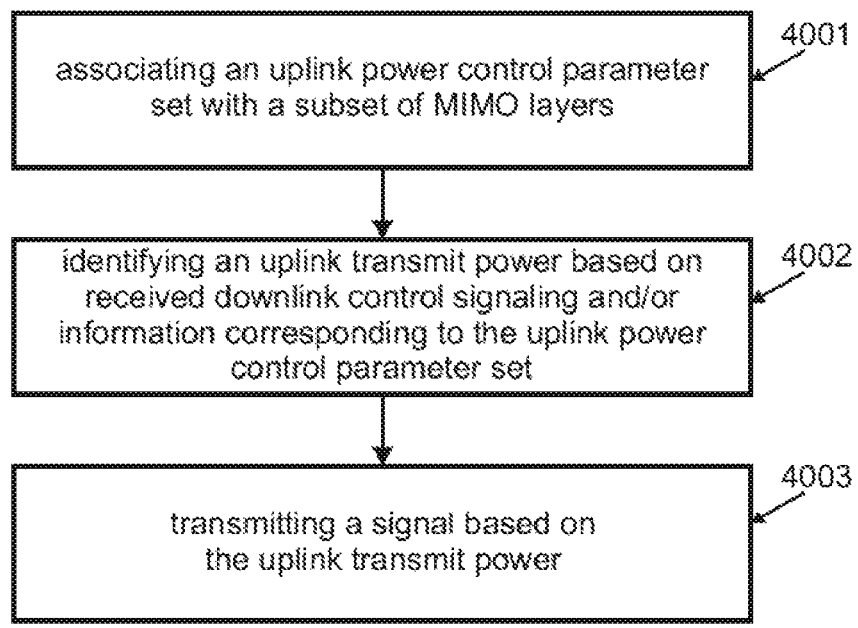
FIG. 4 shows an exemplary uplink power control mechanism that may be employed by an electronic device.

One embodiment of this disclosure is exemplified in the flow chart of FIG. 4, which shows an uplink power control mechanism that may be employed by an electronic device. The electronic device may be for example a wireless terminal device, such as user equipment 103. An uplink power control parameter set is 4001 associated with a subset of uplink MIMO layers (or the association is caused). In an example, the subset of uplink MIMO layers may correspond to a given reception point.

Further, an uplink transmit power based on received downlink control signaling and/or information corresponding to the uplink power control parameter set may be identified 4002 (or the identification is caused). The transmit power may be for example determined using Equation 1 herein above, but it is apparent to the skilled person that also other formulae may be used for this purpose as appropriate.

The information corresponding to the uplink power control parameter set may for example one or more reference signals that are to be used for propagation loss measurement. In a further example, the uplink power control parameter set may include configuration information of the one or more reference signals that should be used for the propagation loss measurements and transmit power determination. This may—in some examples—further involve performing a propagation loss measurement based on one or more reference signal in the downlink to determine the PL. The measured PL may be used in identifying the transmit power at 4002. The downlink control signaling may for example include a transmit power control (TPC) command for use in identifying the transmit power. The TPC command may be for example comprises in Downlink Control Information (DCI). For example, DCI Format 0, 1, 1A, 1B, 1D, 2, 2A, 2C, 2D, 3, 3A of 4 as specified in 3GPP TS 36.212, version 13.0.0 (December 2015) may carry the TCP command. The DCI may be received on a downlink control channel, such as for example a Physical Downlink Control Channel (PDCCH) or Enhanced Physical Downlink Control Channel (EPDCCH).

The electronic device may further transmit 4003 (or a processor thereof may generate and/or cause transmission of) a signal based on the determined uplink transmit power.

The proposed enhancements to uplink power control may be used in 5G systems. In 5G system the uplink transmission may target different reception points 6010, 6020. For example, a certain number of MIMO layers (subset of one or more MIMO layers) can be transmitted to the first reception point 6020 using beamforming of a beam 6004 using an antenna sub-array 6002 of the electronic device 6001, while the another subset of MIMO layers may target the second reception point 6010 using beamforming for another beam 6005 using another antenna subarray 6003 as illustrated exemplarily in FIG. 6. Note that the transmitting electronic device may have an antenna array, and different subsets of the antennas 6002, 6003 may be used to transmit the different subsets of MIMO layers. Furthermore, the reception nodes 6010, 6020 individually may send downlink signals to the electronic device 6001 to individually control the transmit power of the respective beams 6004, 6005 using independent transmit power control loops. The reception nodes 6010, 6020 may also be equipped with respective antenna arrays that have sub-arrays (e.g. sub-arrays 6011, 6012, 6013, 6014 and sub-arrays 6021, 6022, 6023, 6024, respectively) for beamforming individual downlink beams for downlink transmission.

In order to control the transmit power on the respective links to the reception points 6010, 6020 individually, two or more parameter sets can be configured for the electronic device 6001 and associated with respective subsets of MIMO layers (or the antenna sub-array 6002, 6003). In addition, one or more downlink reference signals can be associated with each of the parameter sets for PL measurements. In one example, each parameter set comprises at least the parameters $\{P_0, \alpha\}$, i.e. a power offset, and the degree of pathloss compensation.

Figure 5:
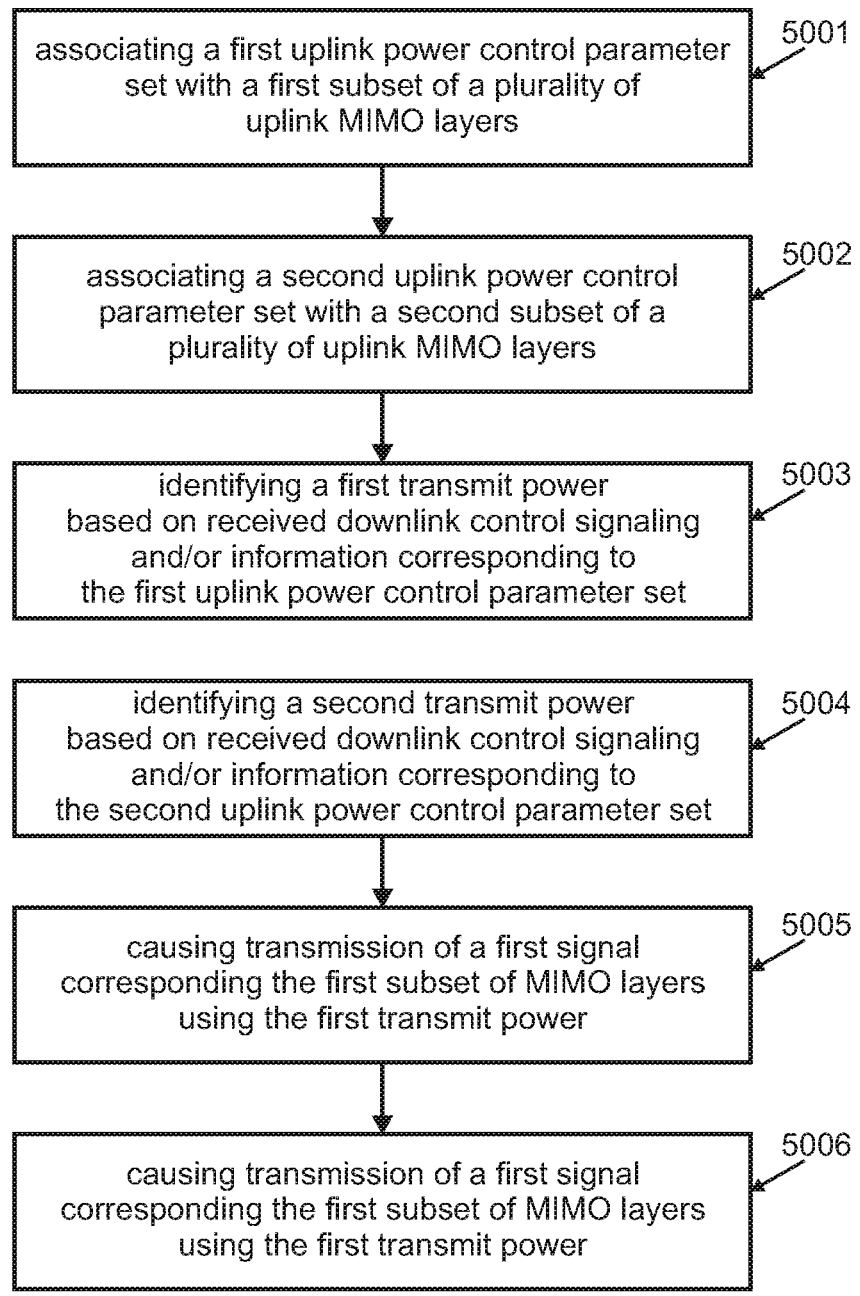
FIG. 5 shows another exemplary uplink power control mechanism that may be employed by an electronic device.

Another embodiment of this disclosure is exemplified in the flow chart of FIG. 5, which is based on FIG. 4, and which shows an uplink power control mechanism that may be employed by an electronic device 6001 for individually controlling the uplink transmit power of different uplink signals (or beams). The electronic device 6001 may be for example a wireless terminal device, such as user equipment 103.

A first uplink power control parameter set is associated 5001 with a first subset of a plurality of uplink MIMO layers, and a second uplink power control parameter set is associated 5002 with a second subset of the plurality of uplink MIMO layers. The subsets of MIMO layers may include mutually or partially different MIMO layers. In some examples, the first subset of uplink MIMO layers corresponds to a first reception point and the second subset of the uplink MIMO layers corresponds to a second reception point that is different than the first reception point. However, the subsets of uplink MIMO layers may also correspond to one reception point only.

In the examples of FIGS. 4 and 5, information on the association of the uplink power control parameter sets with the subsets of the plurality of uplink MIMO layers may be for example received via higher layer signaling. In another implementation, information on the association of the uplink power control parameter sets with the subsets of the plurality of uplink MIMO layers may be received via DCI. For example, for each scheduled MIMO layer or MIMO layers group the index of the uplink power control parameter set could be explicitly provided in DCI.

Alternatively, the association of the uplink power control parameter sets with the subsets of the plurality of uplink MIMO layers could also be predetermined. For example, if multiple UL power control sets are configured and two MIMO layers are used, the first set should be used for the first MIMO layer and the second set should be used for the second MIMO layer. If three MIMO layers are used, the first set should be used for the first and second MIMO layer and the second set should be used for the third MIMO layer.

Further, a first transmit power may be identified or selected 5003 based on received downlink control signaling and/or information corresponding to the first uplink power control parameter set. A second transmit power is identified or selected 5004 based on received downlink control signaling and/or information corresponding to the second uplink power control parameter set.

When using closed-loop power control, the downlink control signaling may for example include a first TPC command for use in identifying the first transmit power, and a second TPC command for use in identifying a the second transmit power. The TPC command may be the parameter $\Delta_i$ in Equation (1) noted above.

The downlink control signaling may be received at the electronic device from one network node (e.g. one reception point), such as an eNB or gNB, even if there are multiple distinct reception points (e.g. centralized power control for a CoMP scenario). Alternatively, downlink control signaling comprising the first TPC command ($\Delta_i$) is received from a first network node (e.g. one of the reception points), such as an eNB, and the second TPC command ($\Delta_i$) is received from a second network node (e.g. another one of the reception points), such as a gNB (e.g. distributed power control for a CoMP scenario). The first TPC command and the second TPC command may be comprises in Downlink Control Information (DCI). Depending on whether a centralized power control or a distributed power control scheme is used in the above noted CoMP example, the TPC commands could be provided in one extended DCI message. It is however also possible that each TPC command is provided in a separate DCI message, which may—optionally—be transmitted by different network nodes (e.g. different reception points). The DCI may be received on a Physical Downlink Control Channel (PDCCH) or Enhanced Physical Downlink Control Channel (EPDCCH). The TPC command $\Delta_i$ may indicate the power adjustment for transmission of the subset of MIMO layers associated to the respective uplink power control parameter set (or control loop) that may be transmitted by the electronic device (e.g. UE) from a specific one of its antenna sub-arrays 6002, 6003.

The tables below show an example mapping of the $\Delta_i$ in the TPC command field of DCI formats 0, 3, and 4, and DCI format 3A (see TS 36.213, version 13.0.1, section 5.1.1.1).

| TPC Command Field in DCI format 0/3/4 | Accumulated $\delta_{PUSCH,c}$ [dB] | Absolute $\delta_{PUSCH,c}$ [dB] only DCI format 0/4 |
| --- | --- | --- |
| 0 | −1 | −4 |
| 1 | 0 | −1 |
| 2 | 1 | 1 |
| 3 | 3 | 4 |

| TPC Command Field in DCI format 3A | Accumulated $\delta_{PUSCH,c}$ [dB] |
| --- | --- |
| 0 | −1 |
| 1 | 1 |

As noted, the closed loop adjustment $\Delta_i$ can be associated with one of the configured power control parameter sets and downlink reference signal(s) used for the PL measurements.

It should be also noted that the power control parameter set to use for the determination of the transmit power for a given subset of MIMO layers may also be dynamically selected from the network side. For example, the network (e.g. the eNB or gNB) may dynamically indicate power control parameter set index to the UE as part of the DCI to provide dynamic information on the selected set of power parameters that should be used for uplink data transmission for the given subset of MIMO layers (i.e. from the associated one antenna sub-array 6002, 6003). For example, a new IE may be defined in the DCI to convey the power control parameter set index. For example, the IE may consist of 1 or 2 bits to allow selection among 2 or 4 power control parameter sets, respectively, but this is just an illustrative and non-limiting example. This dynamic indication may be useful to cope with dynamic blockage, where fast transmit power adjustment is required. Hence in this scenario, each of one or more subsets of MIMO layers may be individually and dynamically associated with one of plural power control parameter sets (corresponding to respective closed-loop power control loops).

Each uplink power control parameter set may for example include configuration information that indicates one or more reference signals that should be used for the propagation loss measurements and transmit power determination. Hence, the first signal corresponding to the subset of MIMO layers and/or first uplink power control parameter set is associated with one or more reference signals for propagation loss measurement, and the second signal corresponding to the second subset of MIMO layers and/or second uplink power control parameter set is associated with another one or more reference signals for propagation loss measurement. In addition or alternatively, the uplink power control parameter sets may each include a desired received signal power $P_0$, and a scaling factor for scaling an estimated pathloss value.

Propagation loss measurement for determining the pathloss (PL) may be performed based on one or more reference signals received in downlink, and the measured PL is used in identifying the first transmit power and/or second transmit power. The reference signals may be received in one or more subframes in the downlink. The PL may be measured for each power control parameter set (or power control loop) individually, so that the transmit power of the first signal may be controlled based on the PL measured using first one or more reference signals, whereas the transmit power of the second signal may be controlled based on the PL measured using second one or more reference signals. Further, the electronic device may also learn the reference signal power indicating the power with which the reference signals are transmitted by the respective transmitting node from control plane signaling in the downlink. Alternatively, the reference signal power may be predetermined. The reference signal power may for example signal in an information element (IE) of some system information broadcast in a cell. It is also possible to use for example Radio Resource Control (RRC) signaling for signaling of the reference signal power. For example, the SIB2 (System Information Block 2) may be used for this purpose. The pathloss may be determined by the electronic device based on a comparison of a measure of the receive power of the reference signal(s) (e.g. RSRP) and the reference signal power. The reference signal(s) for pathloss determination may be one or more of: CRSs (Cell-specific Reference Signals), UE specific reference signals, and/or Channel State Information-Reference Signals (CSI-RSs).

Transmission of a first signal corresponding the first subset of MIMO layers using the first transmit power may be caused 5005. Transmission of a second signal corresponding the second subset of MIMO layers using the second transmit power may be caused 5006. These two steps may be for example realized in some baseband circuitry of the electronic device 6001. Based on these causing, the first signal and second signal may be transmitted by the electronic device 6001 at the first and second transmit power, respectively. The first signal may be transmitted via a first subarray 6002 of antennas of the electronic device 6001, and second signal may be transmitted via a second sub-array 6003 of antennas of the electronic device 6001. The transmission (and reception) of signals may be for example implemented in some Radio Frequency (RF) circuitry provided in the electronic device 6001, while most steps (but not necessarily all steps) of the signal processing may be implemented in baseband circuitry.

The processes described in connection with FIG. 4 and FIG. 5 herein above may be implemented, for example, in form of instructions that are stored on one or more computer readable media. If those instructions are executed by one or more processors of the electronic device 103, 6001, the device is caused to perform the method as illustrated in FIG. 4 or FIG. 5. Note that the processes described in connection with FIG. 4 and FIG. 5 may be for example implemented or executed using baseband circuitry provided in the electronic device 103, 6001. Electronic device 103, 6001 may be or may be implemented as part/circuitry of a user equipment, e.g. a tablet, a smartphone, laptop, etc.

Figure 7:
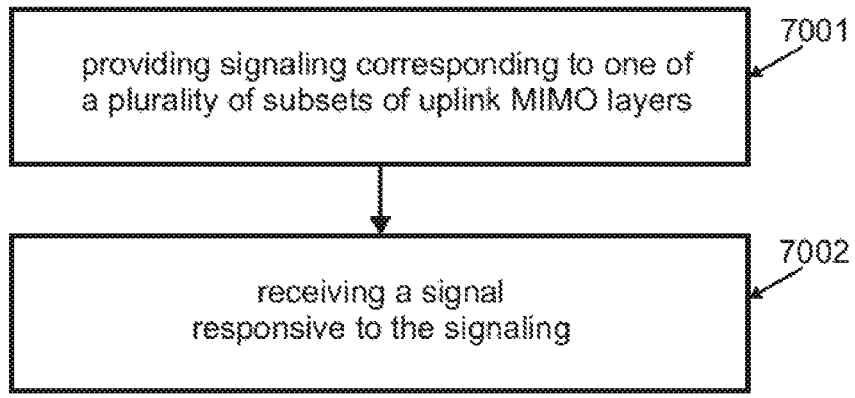
FIG. 7 shows an exemplary uplink power control mechanism that may be employed by a network node in the Radio Access Network (RAN)

Next, the operation of the network side in accordance with different embodiments of this disclosure will be described. FIG. 7 shows an exemplar process, which may be for example performed by a network node in the Radio Access Network (RAN) of a mobile communication system that is in communication with an electronic device 103, 6001. An example of such node would be an eNB or a gNB. The process may include providing 7001, or causing to be provided, signaling corresponding to one of a plurality of subsets of uplink MIMO layers. The signaling, optionally together with other signaling from another network node, may be usable to determine a plurality of UE uplink transmit powers each one of which corresponds to a different one of the plurality of subsets of uplink MIMO layers. The process may further comprise receiving 7002, or causing to be received, a signal responsive to the signaling.

Figure 8:
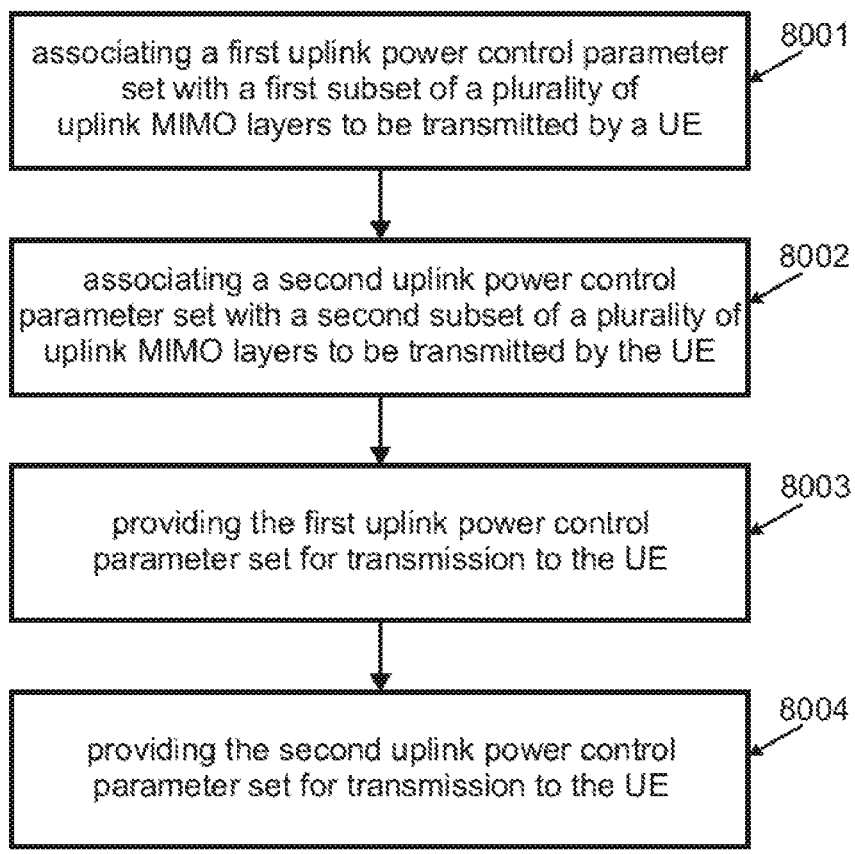
FIG. 8 shows another exemplary uplink power control mechanism that may be employed a network node in the RAN.

FIG. 8 shows another exemplary process for facilitating individual power control loops for different subsets of MIMO layers/signal beams from an electronic device 103, 6001. A first uplink power control parameter set is generated and/or associated 8001 with a first subset of a plurality of uplink MIMO layers to be transmitted by a UE (which serves as an example of an electronic device 103, 6001 here). Further, a second uplink power control parameter set is generated and/or associated 8002 with a second subset of the plurality of uplink MIMO layers to be transmitted by the UE 103, 6001. Further, the first uplink power control parameter set is provided 8003 for transmission to the UE 103, 6001, and the second uplink power control parameter set is provided 8004 for transmission to the UE 103, 6001.

Figure 9:
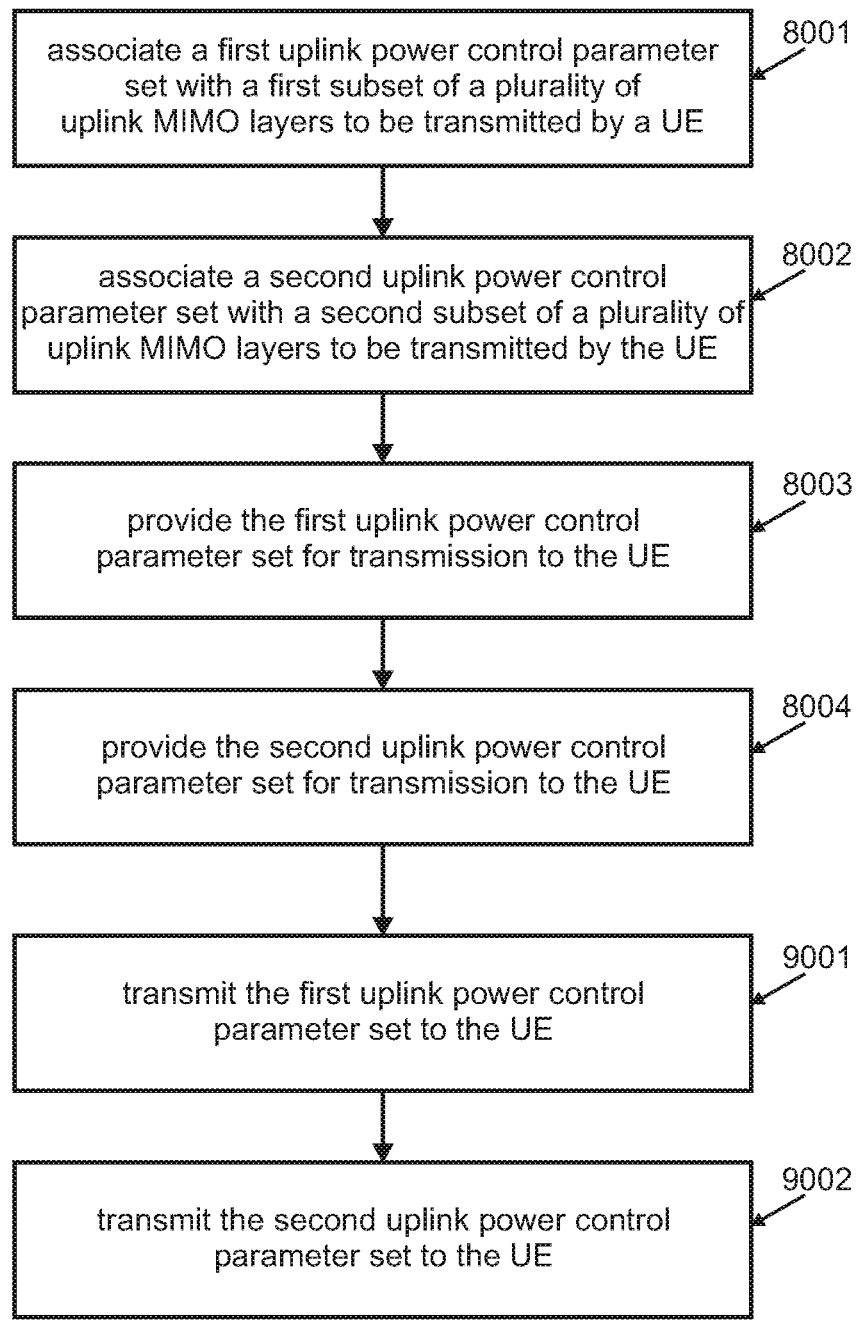
FIG. 9 shows another exemplary uplink power control mechanism that may be employed by a network node in the RAN.

FIG. 9 shows yet another exemplary process for facilitating individual power control loops for different subsets of MIMO layers/signal beams from an electronic device 103, 6001 which differs from FIG. 8 only in that it includes the blocks 9001, 9002 in which the first uplink power control parameter set and second uplink power control parameter set is transmitted to the UE 103, 6001.

In the processes described in connection with FIGS. 7, 8 and 9, the first subset of MIMO layers and/or the first uplink power control parameter set may be associated with one or more reference signals for propagation loss measurement, and the second subset of MIMO layers and/or the second uplink power control parameter set is associated with another one or more reference signals for propagation loss measurement. The processes may further include provide one or more downlink frames for transmission to the UE 103, 6001. The downlink frames may comprise the one or more reference signals, and the other one or more reference signals for propagation loss measurements by the UE.

The processes described in connection with FIGS. 7, 8 and 9, may also include generating downlink control signaling for transmission to the UE 103, 6001. As explained in connection with FIGS. 4, 5 and 6 above, the downlink control signaling may include first TPC command for use by the UE, and a second TPC command for use by the UE. The first TPC command and the second TPC command may be comprises in DCI that is transmitted on a PDCCH or EPDCCH.

Figure 6:
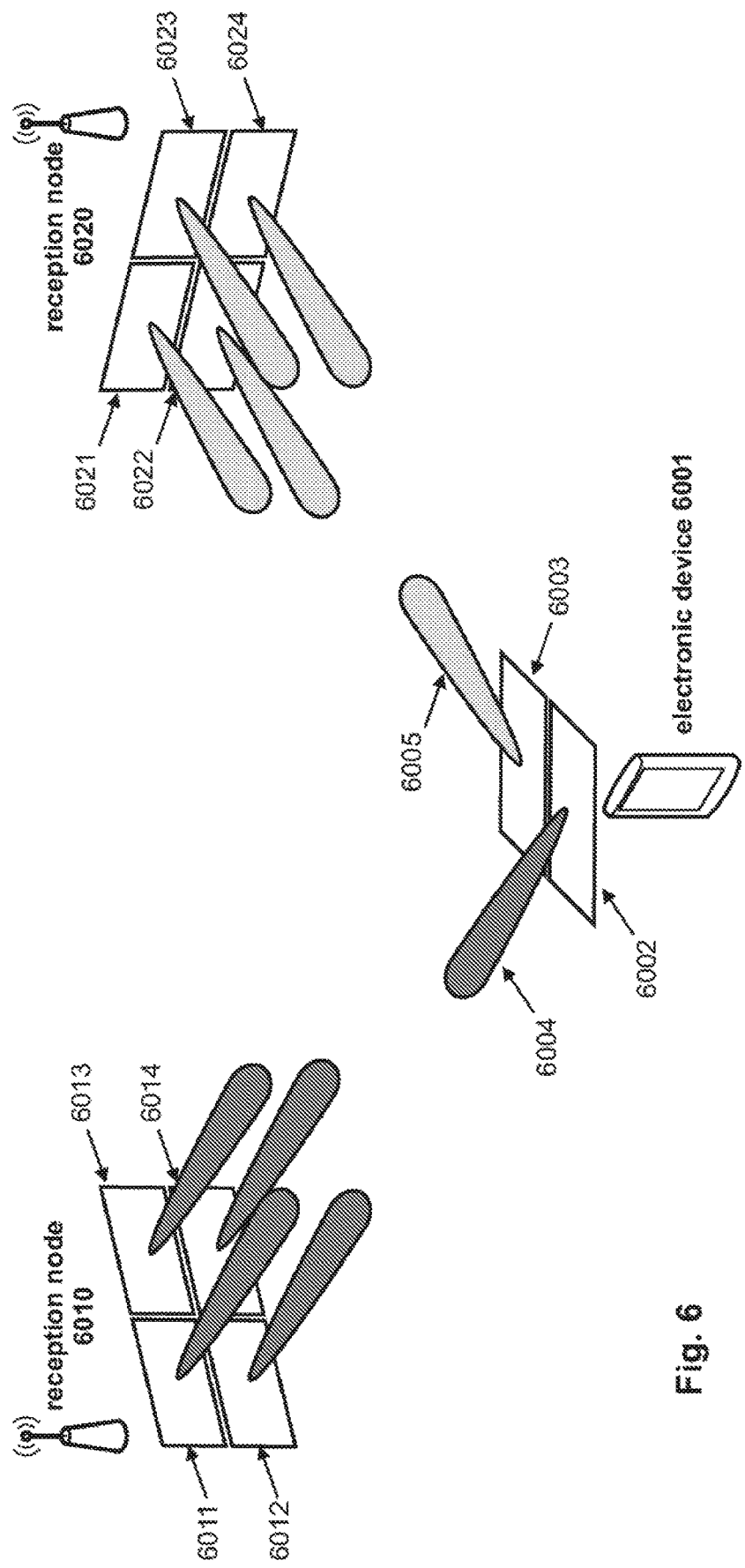
FIG. 6 shows an exemplary CoMP scenario, in which the methods illustrated in FIG. 5 may be used.

In case of CoMP with multiple reception points 6010, 6020 as shown for example in FIG. 6 and using a centralized closed-loop transmission power control instance, there may be one node in the RAN network (e.g. one of the multiple reception points 6010, 6020) that provides the TPC commands to the for use by the UE. This may also be true, if there is only a single reception point that is to receive the distinct beams (carrying the subsets of MIMO layers, respectively). Hence, in these cases, all steps of the processes illustrated in FIGS. 7, 8 and 9 may be performed by one network node. The processes described in connection with FIGS. 7, 8 and 9 may be implemented, for example, in form of instructions that are stored on one or more computer readable media. If those instructions are executed by one or more processors of the network node, e.g. eNB, the network node is caused to perform one of the methods shown in FIGS. 7 to 9, respectively. Note that the processes described in connection with FIGS. 7 and 8 (blocks 7001, 7002, 8001-8004), may be for example implemented or executed using baseband circuitry provided in the network node. The blocks 9001, 9002 of FIG. 9 may be implemented for example by RF circuitry provided in the network node.

If the different closed-loop power control nodes are controlled by respective network nodes, e.g. first network node controlling transmit power for uplink transmission of a first subset of MIMO layers using a first beam, and a second network node controlling transmit power for uplink transmission of a second subset of MIMO layers using a second beam, the steps exemplarily shown in FIGS. 7, 8 and 9 may be implemented in different network nodes. For example, in the scenario of FIG. 6 and assuming that reception node 6010 control transmit power of the beam 6004, and reception node 6020 control transmit power of the beam 6005, steps 8001, 8003 and 9001 may be implemented by circuitry of the reception node 6010, whereas steps 8002, 8004 and 9002 may be implemented by circuitry of the reception node 6020.

Figure 11:
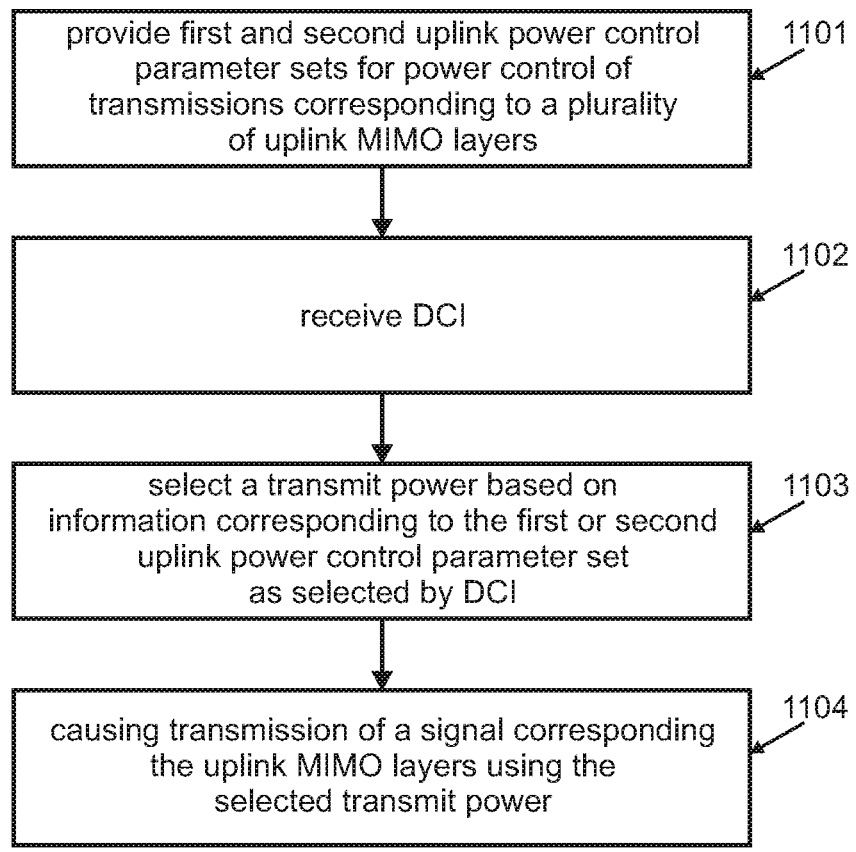
FIG. 11 shows another exemplary uplink power control mechanism that may be employed by an electronic device.

Another embodiment of this disclosure is exemplified in the flow chart of FIG. 11, which shows an uplink power control mechanism that may be employed by an electronic device 103, 6001 for controlling the uplink transmit power of different uplink signals (or beams). A first uplink power control parameter set and a second power control parameter set is provided 1101 for power control of transmissions corresponding to a plurality of uplink MIMO layers. At least some of the parameters in the sets may be received from are received from a node in a radio access network (RAN), for example in form of system information and/or DCI.

Further, (other) DCI may be received 1102. The DCI include an information element selecting either one of the first uplink power control parameter set and the second uplink power control parameter set. A transmit power is selected/identified 1103 based on information corresponding to the first or second uplink power control parameter set as selected by the information element comprised in the DCI and transmission of a signal corresponding the uplink MIMO layers using the selected transmit power is caused/performed 1104. The transmit power may be further selected/identified based on a transmit power control (TPC) command received either in said DCI or other DCI. Moreover, the method may also include receiving one or more downlink signals. The downlink signals may comprise one or more reference signals for propagation loss measurements by the electronic device, and propagation loss measurement for determining the pathloss (PL) may be performed based on one or more reference signals received in downlink, as described earlier. The measured PL is used in selecting the transmit power. The transmit power for the MIMO layers may be selected using for example Equation (1) or Equation (2). The processes described in connection with FIG. 11 may be implemented, for example, in form of instructions that are stored on one or more computer readable media. If those instructions are executed by one or more processors of the electronic device 103, 6001, the device is caused to perform the method as illustrated in FIG. 11. Note that the processes described in connection with FIG. 11 may be for example implemented or executed using baseband circuitry provided in the electronic device 103, 6001.

Figure 12:
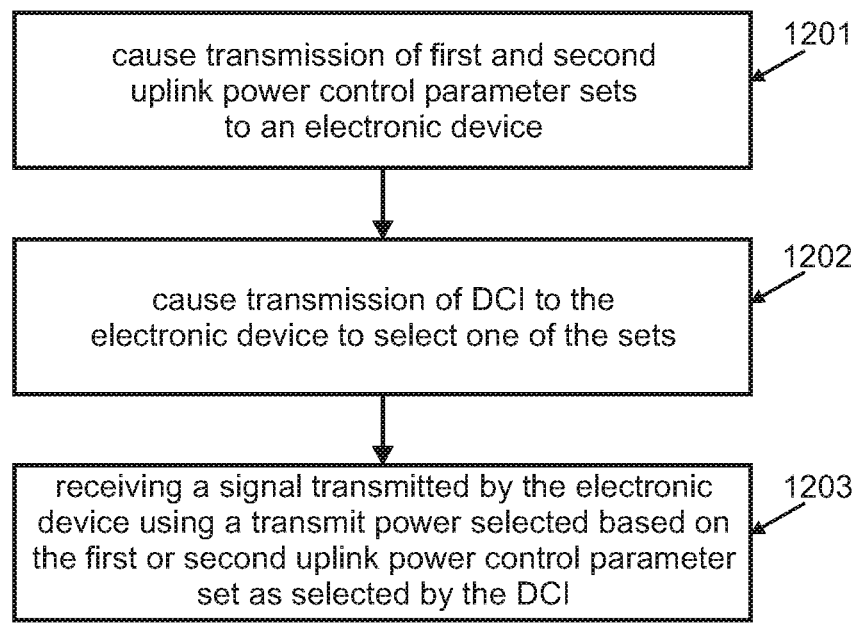
FIG. 12 shows another exemplary uplink power control mechanism that may be employed by a network node in the RAN.

As regards the network side, another embodiment of this disclosure is exemplified in the flow chart of FIG. 12, which shows an uplink power control mechanism that may be employed by a network node in the RAN for controlling the uplink transmit power of different uplink signals (or beams). The process may include causing 1201 transmission of a first uplink power control parameter set and a second power control parameter set to an electronic device for power control of transmissions corresponding to a plurality of uplink MIMO layers. Further, the process includes causing transmission of DCI to the electronic device. The DCI may include an information element selecting either one of the first uplink power control parameter set and the second uplink power control parameter set. Further the process includes the reception of a signal corresponding the uplink MIMO layers and transmitted by the electronic device using a transmit power selected based on the first uplink power control parameter set or the second uplink power control parameter set as selected by the DCI. Optionally, the transmission of at least some parameters in the first uplink power control parameter set and/or the second power control parameter set to the electronic device may be caused. In another example, the process further includes the network node causing transmission of one or more downlink signals to the electronic device, the downlink signals comprising one or more reference signals for propagation loss measurements by the electronic device.

The processes described in connection with FIG. 12 may be implemented, for example, in form of instructions that are stored on one or more computer readable media. If those instructions are executed by one or more processors of a network node 6010, 6020 (e.g. an eNB or gNB), the node is caused to perform the method as illustrated in FIG. 12. Note that the processes described in connection with FIG. 12 may be for example implemented or executed using baseband circuitry provided network node.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 10:
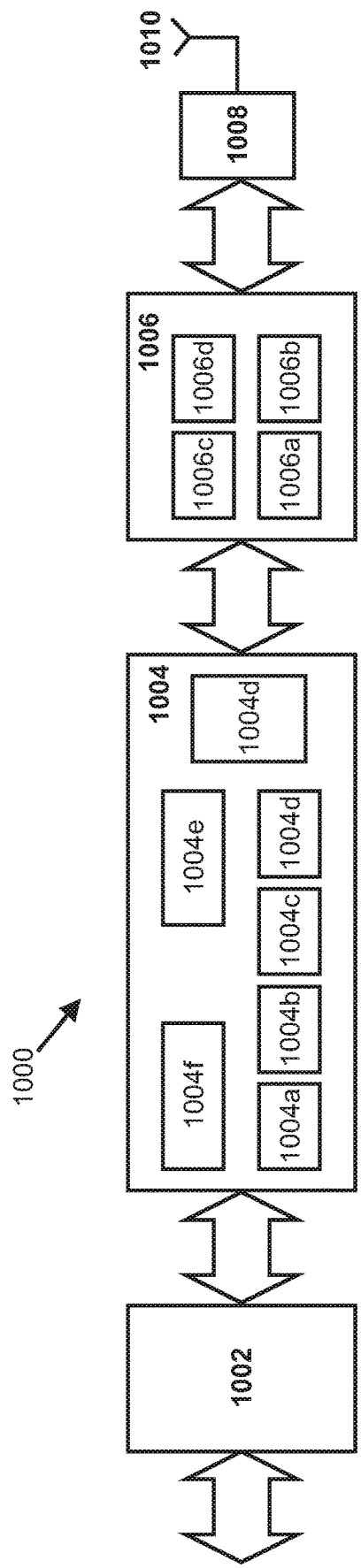
FIG. 10 shows an exemplary electronic device that may be implemented, for example, within a UE or network node in the RA.

Embodiments described herein may be implemented into a system using any suitably configured hardware and/or software. FIG. 10 illustrates, for one embodiment, example components of an electronic device 1000. In embodiments, the electronic device 1000 may be, implement, be incorporated into, or otherwise be a part of a user equipment (UE) 103, 6001, an eNB or gNB 6010, 6020, or some other electronic device. In some embodiments, the electronic device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include one or more of a second generation (2G) baseband processor 1004a, third generation (3G) baseband processor 1004b, fourth generation (4G) baseband processor 1004c, and/or other baseband processor(s) 1004d for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004f. The audio DSP(s) 1004f may be include elements for compression/decompression and echo cancellation and may include other suitable processing elements in other embodiments.

The baseband circuitry 1004 may further include memory/storage 1004g. The memory/storage 1004g may be used to load and store data and/or instructions for operations performed by the processors of the baseband circuitry 1004. Memory/storage for one embodiment may include any combination of suitable volatile memory and/or non-volatile memory. The memory/storage 1004g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1004g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the electronic device 1000 may include additional elements such as, for example, memory/storage, display, camera, sensor, and/or input/output (I/O) interface.

In embodiments where the electronic device 1000 is, implements, is incorporated into, or is otherwise part of a user equipment (UE), baseband circuitry 1004 may be to associate a plurality of uplink power control parameter sets with a plurality of subsets of uplink MIMO (multiple input multiple output) layers, wherein each subset of uplink MIMO layers corresponds to a different reception point, and select an uplink transmit power corresponding to each subset of uplink MIMO layers based on a corresponding one of the plurality of uplink power control parameter sets and/or one or more signals from a corresponding one of the reception points. The RF circuitry 1006 may be to transmit a signal in accordance with the selected uplink transmit powers.

In embodiments where the electronic device 1000 is, implements, is incorporated into, or is otherwise part of an eNB (eNodeB) or gNB (gNodeB), baseband circuitry 1004 may be to generate one or more signals that correspond to one of a plurality of subsets of uplink MIMO (multiple input multiple output) layers, the one or more signals together with one or more other signals from a remote eNB usable to identify a plurality of UE (user equipment) uplink transmit powers each one of which corresponds to a different one of the plurality of subsets of uplink MIMO layers. The RF circuitry 1006 may be to receive a signal responsive to a transmission of the generated one or more signals.

EXAMPLES

Example 1 may include an apparatus of UE (user equipment), the apparatus comprising: means for associating an uplink power control parameter set with a subset of uplink MIMO (multiple input multiple output) layers; means for identifying an uplink transmit power based on received downlink control signaling and/or information corresponding to the uplink power control parameter set; and means for transmitting a signal based on the uplink transmit power.

Example 2 may include the subject matter of Example 1 and/or some other Example herein, further comprising: means for associating an additional uplink power control set with a different subset of the uplink MIMO layers; means for identifying an additional uplink transmit power based on additional received downlink control signaling and information corresponding to the additional uplink power control parameter set; and means for transmitting a signal based on the additional uplink transmit power.

Example 3 may include the subject matter of any of Examples 1-2 and/or some other Example herein, wherein the subset of uplink MIMO layers corresponds to a first reception point and the different subset of the uplink MIMO layers corresponds to a second reception point that is different than the first reception point.

Example 4 may include the subject matter of any of Examples 1-3 and/or some other Example herein, wherein the information corresponding to the uplink power control parameter set specifies a plurality of reference signals for propagation loss measurement.

Example 5 may include the subject matter of any of Examples 1-4 and/or some other Example herein, wherein the uplink power control parameter set includes $\{P_0, \alpha\}$.

Example 6 may include an apparatus of an eNB (eNodeB), the apparatus comprising: means for providing signaling corresponding to one of a plurality of subsets of uplink MIMO (multiple input multiple output) layers, the signaling together with other signaling from a remote eNB usable to identify a plurality of UE (user equipment) uplink transmit powers each one of which corresponds to a different one of the plurality of subsets of uplink MIMO layers; and means for receiving a signal responsive to the signaling.

Example 7 may include the subject matter of Example 6 and/or some other Example herein, wherein the signaling includes DCI (downlink control information).

Example 8 may include the subject matter of any of Examples 6-7 and/or some other Example herein, further comprising: means for transmitting the signaling on the Physical Downlink Control Channel (PDCCH) or Enhanced Physical Downlink Control Channel (EPDCCH).

Example 9 may include the subject matter of any of Examples 6-8 and/or some other Example herein, further comprising: means for dynamically indicating a power control parameter set index to the UE.

Example 10 may include the subject matter of any of Examples 6-9 and/or some other Example herein, further comprising: means for detecting blockage after receiving the signal; and means for providing dynamic information corresponding to one of a plurality of uplink power control parameter sets utilized by the UE responsive to the blockage.

Example 11 may include a method of uplink power control at the UE, wherein the method includes: configuration of two or more power control parameter sets, association of the uplink power control parameter set with subset of the uplink MIMO layer, determination of the uplink transmit power in accordance to the configuration and downlink control signaling from the eNB, and transmission of the signal in accordance to the derive power.

Example 12 may include the method of Example 11 and/or some other Example herein, wherein configuration of power control parameters includes configuration of the at least two reference signals that should be used for the propagation loss measurements.

Example 13 may include the method of Example 12 and/or some other Example herein, wherein the parameter set includes at least $\{P_0, \alpha\}$.

Example 14 may include the method of Example 12 and/or some other Example herein, wherein the parameter set includes configuration of the reference signal that should be used for the propagation loss measurements and transmit power determination.

Example 15 may include the method of Example 11 and/or some other Example herein, wherein each power control parameter set is associated with the set of uplink MIMO layers.

Example 16 may include the method of Example 11 and/or some other Example herein, wherein the activated set can be dynamically indicated to the UE to determine the transmit power.

Example 17 may include the method of Example 11 and/or some other Example herein, wherein separate closed loop power control loops are used for different power control sets.

Example 18 may include an apparatus of a User Equipment (UE), the apparatus comprising baseband circuitry to: associate a plurality of uplink power control parameter sets with a plurality of subsets of uplink MIMO (multiple input multiple output) layers, wherein each subset of uplink MIMO layers corresponds to a different reception point; select an uplink transmit power corresponding to each subset of uplink MIMO layers based on a corresponding one of the plurality of uplink power control parameter sets and/or one or more signals from a corresponding one of the reception points; and Radio Frequency (RF) circuitry coupled to the baseband circuitry, the RF circuitry to transmit a signal in accordance with the selected uplink transmit powers.

Example 19 may include the subject matter of Example 18 and/or some other Example herein, wherein the parameter set includes at least $\{P_0, \alpha\}$.

Example 20 may include the subject matter of Example 18-19 and/or some other Example herein, the baseband circuitry to measure propagation loss associated with the plurality of subsets of uplink MIMO layers in accordance with the plurality of uplink power control parameter sets.

Example 21 may include the subject matter of Examples 18-20 and/or some other Example herein, the baseband circuitry to utilize a separate power control loop for each uplink power control parameter set.

Example 22 may include the subject matter of Examples 18-21 and/or some other Example herein, the baseband circuitry to re-select a corresponding one of the uplink transmit powers responsive to receipt to a dynamic indication from a corresponding one of the reception points.

Example 23 may include the subject matter of Examples 18-22 and/or some other Example herein, wherein a time of the re-selection is after a time of transmission of a corresponding one of the signals.

Example 24 may include the subject matter of Examples 18-23 and/or some other Example herein, the baseband circuitry to select a new uplink transmit power responsive to receipt to a dynamic indication from a corresponding one of the reception points.

Example 25 may include an apparatus of an eNB (eNodeB), the apparatus comprising: baseband circuitry to generate one or more signals that correspond to one of a plurality of subsets of uplink MIMO (multiple input multiple output) layers, the one or more signals together with one or more other signals from a remote eNB usable to identify a plurality of UE (user equipment) uplink transmit powers each one of which corresponds to a different one of the plurality of subsets of uplink MIMO layers: and Radio Frequency (RF) circuitry coupled to the baseband circuitry, the RF circuitry to receive a signal responsive to a transmission of the generated one or more signals.

Example 26 may include the subject matter of Example 25 and/or some other Example herein, wherein the one or more signals include DCI (downlink control information).

Example 27 may include the subject matter of any of Examples 25-26 and/or some other Example herein, the baseband circuitry to cause the one or more signals to be transmitted on a Physical Downlink Control Channel (PDCCH) or Enhanced Physical Downlink Control Channel (EPDCCH).

Example 28 may include the subject matter of any of Examples 25-27 and/or some other Example herein, the baseband circuitry to dynamically indicate a power control parameter set index to the UE.

Example 29 may include the subject matter of any of Examples 25-28 and/or some other Example herein, the baseband circuitry to determine whether a blockage occurs after receiving the signal.

Example 30 may include the subject matter of any of Examples 25-29 and/or some other Example herein, the baseband circuitry to cause dynamic information corresponding to one of a plurality of uplink power control parameter sets utilized by the UE to be transmitted to the UE responsive to blockage.

Example 31 may include a method, the method comprising: associating, or causing to be associated, an uplink power control parameter set with a subset of uplink MIMO (multiple input multiple output) layers; identifying, or causing to be identified, an uplink transmit power based on received downlink control signaling and/or information corresponding to the uplink power control parameter set; and transmitting, or causing to be transmitted, a signal based on the uplink transmit power.

Example 32 may include the subject matter of Example 31 and/or some other Example herein, further comprising: associating, or causing to be associated, an additional uplink power control set with a different subset of the uplink MIMO layers; identifying, or causing to be identified, an additional uplink transmit power based on additional received downlink control signaling and information corresponding to the additional uplink power control parameter set; and transmitting, or causing to be transmitted, a signal based on the additional uplink transmit power.

Example 33 may include the subject matter of any of Examples 31-32 and/or some other Example herein, wherein the subset of uplink MIMO layers corresponds to a first reception point and the different subset of the uplink MIMO layers corresponds to a second reception point that is different than the first reception point.

Example 34 may include the subject matter of any of Examples 31-33 and/or some other Example herein, wherein the information corresponding to the uplink power control parameter set specifies a plurality of reference signals for propagation loss measurement.

Example 35 may include the subject matter of any of Examples 31-34 and/or some other Example herein, wherein the uplink power control parameter set includes $\{P_0, \alpha\}$.

Example 35.1 may include the subject matter of Example 31-35 and/or some other Example herein, wherein the method is performed by a UE or a portion thereof.

Example 36 may include a method, the method comprising: providing, or causing to be provided, signaling corresponding to one of a plurality of subsets of uplink MIMO (multiple input multiple output) layers, the signaling together with other signaling from a remote eNB (eNB) usable to determine a plurality of UE (user equipment) uplink transmit powers each one of which corresponds to a different one of the plurality of subsets of uplink MIMO layers; and receiving, or causing to be received, a signal responsive to the signaling.

Example 37 may include the subject matter of Example 36 and/or some other Example herein, wherein the signaling includes DCI (downlink control information).

Example 38 may include the subject matter of any of Examples 36-37 and/or some other Example herein, further comprising: transmitting, or causing to be transmitted, the signaling on the Physical Downlink Control Channel (PDCCH) or Enhanced Physical Downlink Control Channel (EPDCCH).

Example 39 may include the subject matter of any of Examples 36-38 and/or some other Example herein, further comprising: dynamically indicating, or causing to be dynamically indicated, a power control parameter set index to the UE.

Example 40 may include the subject matter of any of Examples 36-39 and/or some other Example herein, further comprising: detecting, or causing to be detected, blockage after receiving the signal; and providing, or causing to be provided, dynamic information corresponding to one of a plurality of uplink power control parameter sets utilized by the UE responsive to the blockage.

Example 40.1 may include the subject matter of Examples 36-40 and/or some other Example herein, wherein the method is performed by an eNB or a portion thereof.

Example 41 may include an apparatus comprising means to perform one or more elements of a method described in or related to any of Examples 1-40.1, or any other method or process described herein.

Example 42 may include one or more non-transitory computer-readable media comprising instructions to cause an electronic device, upon execution of the instructions by one or more processors of the electronic device, to perform one or more elements of a method described in or related to any of Examples 1-40.1, or any other method or process described herein.

Example 43 may include an apparatus comprising logic, modules, and/or circuitry to perform one or more elements of a method described in or related to any of Examples 1-40.1, or any other method or process described herein.

Example 44 may include a method, technique, or process as described in or related to any of Examples 1-40.1, or portions or parts thereof.

Example 45 may include an apparatus comprising: one or more processors and one or more computer readable media comprising instructions that, when executed by the one or more processors, cause the one or more processors to perform the method, techniques, or process as described in or related to any of Examples 1-40.1, or portions thereof.

Example 46 may include a method of communicating in a wireless network as shown and described herein.

Example 47 may include a system for providing wireless communication as shown and described herein.

Example 48 may include a device for providing wireless communication as shown and described herein.

Example 49 provides one or more non-transitory computer-readable media comprising instructions to cause an electronic device, upon execution of the instructions by one or more processors of the electronic device, to perform uplink transmit power control, by: associating a first uplink power control parameter set with a first subset of a plurality of uplink Multiple Input Multiple Output (MIMO) layers; associating a second uplink power control parameter set with a second subset of the plurality of uplink MIMO layers; identifying a first transmit power based on received downlink control signaling and/or information corresponding to the first uplink power control parameter set; identifying a second transmit power based on received downlink control signaling and/or information corresponding to the second uplink power control parameter set; causing transmission of a first signal corresponding the first subset of MIMO layers using the first transmit power; and causing transmission of a second signal corresponding the second subset of MIMO layers using the second transmit power.

Example 50 may include the one or more non-transitory computer-readable media of Example 1, wherein the first subset of uplink MIMO layers corresponds to a first reception point and the second subset of the uplink MIMO layers corresponds to a second reception point that is different than the first reception point.

Example 51 may include the one or more non-transitory computer-readable media of Example 49 or 50, wherein the information corresponding to the uplink power control parameter set specifies one or more reference signals for propagation loss measurement.

Example 52 may include the one or more non-transitory computer-readable media of one of Examples 49 to 51, wherein the instructions further cause an electronic device to: perform a propagation loss measurement for determining the pathloss (PL) based on one or more reference signals received in downlink; wherein the measured PL is used in identifying the first transmit power and/or second transmit power.

Example 53 may include the one or more non-transitory computer-readable media of Example 52, wherein the first signal corresponding to the subset of MIMO layers and/or first uplink power control parameter set is associated with one or more reference signals for propagation loss measurement, and the second signal corresponding to the second subset of MIMO layers and/or second uplink power control parameter set is associated with another one or more reference signals for propagation loss measurement.

Example 54 may include the one or more non-transitory computer-readable media of one of Examples 49 to 53, wherein each uplink power control parameter set includes configuration information indicating one or more reference signals that should be used for the propagation loss measurements and transmit power determination.

Example 55 may include the one or more non-transitory computer-readable media of one of Examples 49 to 54, wherein the downlink control signaling includes a first transmit power control (TPC) command for use in identifying the first transmit power, and a second TPC command for use in identifying the second transmit power.

Example 56 may include the one or more non-transitory computer-readable media of Example 55, wherein the first TPC command and the second TPC command are comprises in Downlink Control Information (DCI).

Example 57 may include the one or more non-transitory computer-readable media of Example 56, further comprising receiving the DCI on a Physical Downlink Control Channel (PDCCH) or Enhanced Physical Downlink Control Channel (EPDCCH).

Example 58 may include the one or more non-transitory computer-readable media of one of Examples 49 to 57, wherein the first and second uplink power control parameter sets each include a desired received signal power $P_0$, and a scaling factor for scaling an estimated pathloss value.

Example 59 may include the one or more non-transitory computer-readable media of one of Examples 49 to 58, wherein the instructions cause the electronic device to receive information on the association of the uplink power control parameter sets with the subsets of the plurality of uplink MIMO layers via higher layer signaling.

Example 60 may include the one or more non-transitory computer-readable media of one of Examples 1 to 10, wherein the instructions cause the electronic device to receive information on the association of the uplink power control parameter sets with the subsets of the plurality of uplink MIMO layers via Downlink Control Information (DCI).

Example 61 may include the one or more non-transitory computer-readable media of one of Examples 49 to 58, wherein the association of the uplink power control parameter sets with the subsets of the plurality of uplink MIMO layers is predetermined.

Example 62 provides baseband circuitry for use in a user equipment (UE), the baseband circuitry configured to: associate a first uplink power control parameter set with a first subset of a plurality of uplink Multiple Input Multiple Output (MIMO) layers corresponding to a first reception point; associate a second uplink power control parameter set with a second subset of the plurality of uplink MIMO layers corresponding to a second reception point; select a first transmit power based on received downlink control signaling and/or information corresponding to the first uplink power control parameter set; select a second transmit power based on received downlink control signaling and/or information corresponding to the second uplink power control parameter set; cause transmission of a first signal corresponding the first subset of MIMO layers using the first transmit power; and cause transmission of a second signal corresponding the second subset of MIMO layers using the second transmit power.

Example 63 may include baseband circuitry of Example 62, wherein the baseband circuitry is to utilize a separate power control loop for each uplink power control parameter set.

Example 64 may include baseband circuitry of Example 62 or 63, further configured to perform a propagation loss measurement for determining the pathloss (PL) based one or more reference signals received in downlink; wherein the measured PL is used in identifying the first transmit power and/or second transmit power.

Example 65 may include baseband circuitry of Example 64, wherein the first signal corresponding to the subset of MIMO layers and/or first uplink power control parameter set is associated with one or more reference signals for propagation loss measurement, and the second signal corresponding to the second subset of MIMO layers and/or second uplink power control parameter set is associated with another one or more reference signals for propagation loss measurement.

Example 66 may include baseband circuitry of one of Examples 62 to 65, wherein the downlink control signaling includes a first transmit power control (TPC) command for use in identifying a first transmit power, and a second TPC command for use in identifying a second transmit power.

Example 67 may include baseband circuitry of Example 66, wherein the first TPC command and the second TPC command are comprised in Downlink Control Information (DCI) received via a Physical Downlink Control Channel (PDCCH) or Enhanced Physical Downlink Control Channel (EPDCCH), and the baseband circuitry is to decode the DCI.

Example 68 may include baseband circuitry of one of Examples 62 to 67, wherein the first and second uplink power control parameter sets each include a desired received signal power, and a scaling factor for scaling an estimated pathloss value.

Example 69 may include baseband circuitry of one of Examples 62 to 68, wherein the baseband circuitry is to re-select a corresponding one of the uplink transmit powers responsive to receipt to a dynamic indication from a corresponding one of the reception points.

Example 70 may include baseband circuitry of one of Examples 62 to 69, wherein the baseband circuitry is to select a new uplink transmit power responsive to receipt to a dynamic indication from a corresponding one of the reception points.

Example 71 provides Radio Frequency (RF) circuitry for use in a user equipment, the RF circuitry configured to: transmit a first signal corresponding a first subset of a plurality of MIMO layers using a first transmit power; and transmit a second signal corresponding a second subset of said plurality of MIMO layers using a second transmit power.

Example 72 may include the RF circuitry of Example 71, further configured to: receive information on an association of a first uplink power control parameter set with the first subset of the plurality of uplink MIMO layers, and an association of a second uplink power control parameter set with the second subset of the plurality of uplink MIMO layers via higher layer signaling.

Example 73 may include RF circuitry of Example 71, further configured to: receive information on an association of a first uplink power control parameter set with the first subset of the plurality of uplink MIMO layers, and an association of a second uplink power control parameter set with the second subset of the plurality of uplink MIMO layers via Downlink Control Information (DCI).

Example 74 provides a user equipment (UE) comprising baseband circuitry according to one of Examples 62 to 70.

Example 75 may include the UE of Example 74, further comprising radio Frequency (RF) circuitry according to one of Examples 71 to 73 coupled to the baseband circuitry.

Example 76 provides a user equipment (UE) comprising one or more non-transitory computer-readable media according to one of Examples 49 to 61, and one or more processors to execute instructions stored on said one or more non-transitory computer-readable media.

Example 77 provides one or more non-transitory computer-readable media comprising instructions to cause an electronic device, upon execution of the instructions by one or more processors of the electronic device, to perform uplink transmit power control, by: associating a first uplink power control parameter set with a first subset of a plurality of uplink Multiple Input Multiple Output (MIMO) layers to be transmitted by a user equipment (UE); associating a second uplink power control parameter set with a second subset of the plurality of uplink MIMO layers to be transmitted by the UE; providing the first uplink power control parameter set for transmission to the UE; and providing the second uplink power control parameter set for transmission to the UE.

Example 78 may include the one or more non-transitory computer-readable media of Example 77, wherein the first subset of uplink MIMO layers corresponds to a first reception point and the second subset of the uplink MIMO layers corresponds to a second reception point that is different than the first reception point.

Example 79 may include the one or more non-transitory computer-readable media of Example 77 or 78, wherein the information corresponding to the uplink power control parameter set specifies one or more reference signals for propagation loss measurement.

Example 80 may include the one or more non-transitory computer-readable media of one of Examples 77 to 79, wherein the first subset of MIMO layers and/or the first uplink power control parameter set is associated with one or more reference signals for propagation loss measurement, and the second subset of MIMO layers and/or the second uplink power control parameter set is associated with another one or more reference signals for propagation loss measurement; and the instructions further cause the electronic device to provide one or more downlink frames for transmission, the downlink frames comprising said one or more reference signals, and said other one or more reference signals for propagation loss measurements by the UE.

Example 81 may include the one or more non-transitory computer-readable media of one of Examples 77 to 80, wherein the instructions cause the electronic device to generate downlink control signaling for transmission to the UE, the downlink control signaling including a first transmit power control (TPC) command for use by the UE, and a second TPC command for use by the UE.

Example 82 may include the one or more non-transitory computer-readable media of Example 81, wherein the first TPC command and the second TPC command are comprises in Downlink Control Information (DCI).

Example 83 may include the one or more non-transitory computer-readable media of Example 82, wherein the instructions cause the electronic device to provide the DCI for transmission on a Physical Downlink Control Channel (PDCCH) or Enhanced Physical Downlink Control Channel (EPDCCH).

Example 84 may include the one or more non-transitory computer-readable media of one of Examples 77 to 83, wherein the first and second uplink power control parameter sets each include a desired received signal power $P_0$, and a scaling factor for scaling an estimated pathloss value.

Example 85 may include the one or more non-transitory computer-readable media of one of Examples 77 to 84, wherein the information on the association of the uplink power control parameter sets with the subsets of the plurality of uplink MIMO layers is provided to the UE via higher layer signaling.

Example 86 may include the one or more non-transitory computer-readable media of one of Examples 77 to 84, wherein the information on the association of the uplink power control parameter sets with the subsets of the plurality of uplink MIMO layers is provided to the UE via Downlink Control Information (DCI).

Example 88 may include the one or more non-transitory computer-readable media of one of Examples 77 to 84, wherein the association of the uplink power control parameter sets with the subsets of the plurality of uplink MIMO layers is predetermined.

Example 89 provides baseband circuitry for use in an network node, the baseband circuitry configured to: associate a first uplink power control parameter set with a first subset of a plurality of uplink Multiple Input Multiple Output (MIMO) layers to be transmitted by a user equipment (UE); associate a second uplink power control parameter set with a second subset of the plurality of uplink MIMO layers to be transmitted by the UE; generate first uplink power control parameter set for transmission to the UE; and generate second uplink power control parameter set for transmission to the UE.

Example 90 may include baseband circuitry of Example 89, wherein the first subset of uplink MIMO layers corresponds to a first reception point and the second subset of the uplink MIMO layers corresponds to a second reception point that is different than the first reception point.

Example 91 may include baseband circuitry of Example 89 or 90, wherein the information corresponding to the uplink power control parameter set specifies one or more reference signals for propagation loss measurement.

Example 92 may include baseband circuitry of one of Examples 89 to 91, wherein the first subset of MIMO layers and/or the first uplink power control parameter set is associated with one or more reference signals for propagation loss measurement, and the second subset of MIMO layers and/or the second uplink power control parameter set is associated with another one or more reference signals for propagation loss measurement; and the baseband circuitry further configured to generate one or more downlink frames for transmission, the downlink frames comprising said one or more reference signals, and said other one or more reference signals for propagation loss measurements by the UE.

Example 93 may include baseband circuitry of one of Example 89 to 92, wherein the instructions cause the electronic device to generate downlink control signaling for transmission to the UE, the downlink control signaling including a first transmit power control (TPC) command for use by the UE, and a second TPC command for use by the UE.

Example 94 may include baseband circuitry of Example 93, wherein the first TPC command and the second TPC command are comprises in Downlink Control Information (DCI).

Example 95 may include baseband circuitry of Example 94, wherein the instructions cause the electronic device to provide the DCI for transmission on a Physical Downlink Control Channel (PDCCH) or Enhanced Physical Downlink Control Channel (EPDCCH).

Example 96 may include baseband circuitry of one of Example 89 to 95, wherein the first and second uplink power control parameter sets each include a desired received signal power $P_0$, and a scaling factor for scaling an estimated pathloss value.

Example 97 may include baseband circuitry of one of Example 89 to 96, wherein the information on the association of the uplink power control parameter sets with the subsets of the plurality of uplink MIMO layers is provided to the UE via higher layer signaling.

Example 98 may include baseband circuitry of one of Examples 89 to 97, wherein the information on the association of the uplink power control parameter sets with the subsets of the plurality of uplink MIMO layers is provided to the UE via Downlink Control Information (DCI).

Example 99 may include baseband circuitry of one of Examples 89 to 99, wherein the association of the uplink power control parameter sets with the subsets of the plurality of uplink MIMO layers is predetermined.

Example 100 provides Radio Frequency (RF) circuitry for use in a network node, the RF circuitry configured to: transmit, to a user equipment (UE), information on an association of a first uplink power control parameter set with a first subset of the plurality of uplink MIMO layers, and an association of a second uplink power control parameter set with a second subset of the plurality of uplink MIMO layers receive a first signal corresponding the first subset of a plurality of MIMO layers; and receive a second signal corresponding the second subset of said plurality of MIMO layers.

Example 101 may include the RF circuitry of Example 100, the information on the association is transmitted via higher layer signaling or Downlink Control Information (DCI).

Example 102 provides a network node comprising baseband circuitry according to one of Examples 89 to 99.

Example 103 may include the network node of Example 102, further comprising radio Frequency (RF) circuitry of Example 100 or 101 coupled to the baseband circuitry.

Example 104 provides a network node comprising one or more non-transitory computer-readable media according to one of Examples 77 to 88, and one or more processors to execute instructions stored on said one or more non-transitory computer-readable media.

Example 105 provides one or more non-transitory computer-readable media comprising instructions to cause an electronic device, upon execution of the instructions by one or more processors of the electronic device, to perform uplink transmit power control, by: providing a first uplink power control parameter set and a second power control parameter set for power control of transmissions corresponding to a plurality of uplink MIMO layers; receiving or Downlink Control Information (DCI), wherein the DCI include an information element selecting either one of the first uplink power control parameter set and the second uplink power control parameter set; selecting a transmit power based on information corresponding to the first or second uplink power control parameter set as selected by the information element comprised in the DCI; and causing transmission of a signal corresponding the uplink MIMO layers using the selected transmit power.

Example 106 may include the one or more non-transitory computer-readable media of Example 105, wherein the transmit power is further selected based on a transmit power control (TPC) command received either in said DCI or other DCI.

Example 107 may include the one or more non-transitory computer-readable media of Example 105 or 106, wherein at least some parameters in the first uplink power control parameter set and/or the second power control parameter set are received from a node in a radio access network (RAN).

Example 108 may include the one or more non-transitory computer-readable media of one of Examples 105 to 107, wherein the instructions further cause the electronic device to: receive one or more downlink signals, the downlink signals comprising one or more reference signals for propagation loss measurements by the electronic device; perform a propagation loss measurement for determining the pathloss (PL) based on one or more reference signals received in downlink; wherein the measured PL is used in determining the transmit power.

Example 109 provides baseband circuitry for use in an network node, the baseband circuitry configured to: provide a first uplink power control parameter set and a second power control parameter set for power control of transmissions corresponding to a plurality of uplink MIMO layers; receive or Downlink Control Information (DCI), wherein the DCI include an information element selecting either one of the first uplink power control parameter set and the second uplink power control parameter set; select a transmit power based on information corresponding to the first or second first uplink power control parameter set as selected by the information element comprised in the DCI; and cause transmission of a signal corresponding the uplink MIMO layers using the identified transmit power.

Example 110 may include the baseband circuitry of Example 109, wherein the transmit power is further identified based on a transmit power control (TPC) command received either in said DCI or other DCI.

Example 111 may include the baseband circuitry of Example 109 or 110, wherein at least some parameters in the first uplink power control parameter set and/or the second power control parameter set are received from a node in a radio access network (RAN).

Example 112 may include the baseband circuitry of one of Examples 109 to 111, wherein the baseband circuitry is configured to: receive one or more downlink signals, the downlink signals comprising one or more reference signals for propagation loss measurements by the electronic device; perform a propagation loss measurement for determining the pathloss (PL) based on one or more reference signals received in downlink; wherein the measured PL is used in identifying the transmit power.

Example 113 provides a user equipment (UE) comprising baseband circuitry of one of Examples 109 to 111.

Example 114 provides a user equipment (UE) comprising one or more non-transitory computer-readable media according to one of Examples 105 to 108, and one or more processors to execute instructions stored on said one or more non-transitory computer-readable media.

Example 115 provides one or more non-transitory computer-readable media comprising instructions to cause an network node, upon execution of the instructions by one or more processors of the network node, to perform uplink transmit power control, by: causing transmission of a first uplink power control parameter set and a second power control parameter set to an electronic device for power control of transmissions corresponding to a plurality of uplink MIMO layers; causing transmission of Downlink Control Information (DCI) to the electronic device, wherein the DCI include an information element selecting either one of the first uplink power control parameter set and the second uplink power control parameter set; receiving a signal corresponding the uplink MIMO layers and transmitted by the electronic device using a transmit power selected based on the first uplink power control parameter set or the second uplink power control parameter set as selected by the DCI.

Example 116 may include the one or more non-transitory computer-readable media of Example 115, wherein the instructions further cause the network node to cause transmission of at least some parameters in the first uplink power control parameter set and/or the second power control parameter set to the electronic device.

Example 117 may include the one or more non-transitory computer-readable media of Example 115 or 116, wherein the instructions further cause the network node to cause transmission of one or more downlink signals to the electronic device, the downlink signals comprising one or more reference signals for propagation loss measurements by the electronic device.

Example 118 provides baseband circuitry for use in an network node, the baseband circuitry configured to: cause transmission of a first uplink power control parameter set and a second power control parameter set to an electronic device for power control of transmissions corresponding to a plurality of uplink MIMO layers; cause transmission of Downlink Control Information (DCI) to the electronic device, wherein the DCI include an information element selecting either one of the first uplink power control parameter set and the second uplink power control parameter set; and receive a signal corresponding the uplink MIMO layers and transmitted by the electronic device using a transmit power selected based on the first uplink power control parameter set or the second uplink power control parameter set as selected by the DCI.

Example 119 may include the baseband circuitry of Example 118, wherein the instructions further cause the network node to cause transmission of at least some parameters in the first uplink power control parameter set and/or the second power control parameter set to the electronic device.

Example 120 may include the baseband circuitry of Example 118 or 119, wherein the instructions further cause the network node to cause transmission of one or more downlink signals to the electronic device, the downlink signals comprising one or more reference signals for propagation loss measurements by the electronic device.

Example 121 provides a network node comprising baseband circuitry of one of Examples 118 to 120.

Example 122 provides a network node comprising one or more non-transitory computer-readable media according to one of Examples 115 to 117, and one or more processors to execute instructions stored on said one or more non-transitory computer-readable media.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. One or more non-transitory computer-readable media comprising instructions to cause an electronic device, upon execution of the instructions by one or more processors of the electronic device, to perform uplink transmit power control, by:
    associating a first uplink power control parameter set with a first beam associated with a first subset of a plurality of uplink Multiple Input Multiple Output (MIMO) layers;
    associating a second uplink power control parameter set with a second beam associated with a second subset of the plurality of uplink MIMO layers;
    identifying a first transmit power based on received downlink control signaling or information corresponding to the first uplink power control parameter set;
    identifying a second transmit power based on received downlink control signaling or information corresponding to the second uplink power control parameter set;
    causing transmission of the first beam associated with the first subset of MIMO layers using the first transmit power; and
    causing transmission of the second beam associated with the second subset of MIMO layers using the second transmit power.

2. The one or more non-transitory computer-readable media of claim 1, wherein the first subset of uplink MIMO layers corresponds to a first reception point and the second subset of the uplink MIMO layers corresponds to a second reception point that is different than the first reception point.

3. The one or more non-transitory computer-readable media of claim 1, wherein the information corresponding to the uplink power control parameter set specifies one or more reference signals for propagation loss measurement.

4. The one or more non-transitory computer-readable media of claim 1, wherein the instructions further cause an electronic device to:
    perform a propagation loss measurement for determining the pathloss (PL) based on one or more reference signals received in downlink;
    wherein the measured PL is used in identifying the first transmit power or second transmit power.

5. The one or more non-transitory computer-readable media of claim 4, wherein the first signal corresponding to the subset of MIMO layers or first uplink power control parameter set is associated with one or more reference signals for propagation loss measurement, and the second signal corresponding to the second subset of MIMO layers or second uplink power control parameter set is associated with another one or more reference signals for propagation loss measurement.

6. The one or more non-transitory computer-readable media of claim 1, wherein each uplink power control parameter set includes configuration information indicating one or more reference signals that should be used for the propagation loss measurements and transmit power determination.

7. The one or more non-transitory computer-readable media of claim 1, wherein the downlink control signaling includes a first transmit power control (TPC) command for use in identifying the first transmit power, and a second TPC command for use in identifying the second transmit power, and
    wherein the first TPC command and the second TPC command are comprises in Downlink Control Information (DCI),
    wherein the instructions further cause an electronic device to:
    receive the DCI on a Physical Downlink Control Channel (PDCCH) or Enhanced Physical Downlink Control Channel (EPDCCII).

8. The one or more non-transitory computer-readable media of claim 1, wherein the first and second uplink power control parameter sets each include a desired received signal power P0, and a scaling factor for scaling an estimated pathloss value.

9. The one or more non-transitory computer-readable media of claim 1, wherein the instructions cause the electronic device to receive information on the association of the uplink power control parameter sets with the subsets of the plurality of uplink MIMO layers via higher layer signaling or via Downlink Control Information (DCI).

10. Baseband circuitry for use in a user equipment (UE), comprising:
   circuitry to associate a first uplink power control parameter set with a first beam associated with a first subset of a plurality of uplink Multiple Input Multiple Output (MIMO) layers corresponding to a first reception point;
   circuitry to associate a second uplink power control parameter set with a second beam associated with a second subset of the plurality of uplink MIMO layers corresponding to a second reception point;
   circuitry to select a first transmit power based on received downlink control signaling or information corresponding to the first uplink power control parameter set;
   circuitry to select a second transmit power based on received downlink control signaling or information corresponding to the second uplink power control parameter set;
   circuitry to cause transmission of the first beam associated with the first subset of MIMO layers using the first transmit power; and
   circuitry to cause transmission of the second beam associated with the second subset of MIMO layers using the second transmit power.

11. The baseband circuitry of claim 10, further comprising:
   circuitry to utilize a separate power control loop for each uplink power control parameter set.

12. One or more non-transitory computer-readable media comprising instructions to cause a network node, upon execution of the instructions by one or more processors of the network node, to perform uplink transmit power control, by:
   associating a first uplink power control parameter set with a first beam associated with a first subset of a plurality of uplink Multiple Input Multiple Output (MIMO) layers to be transmitted by a user equipment (UE);
   associating a second uplink power control parameter set with a second beam associated with a second subset of the plurality of uplink MIMO layers to be transmitted by the UE;
   providing the first uplink power control parameter set for transmission to the UE; and
   providing the second uplink power control parameter set for transmission to the UE.

13. The one or more non-transitory computer-readable media of claim 12, wherein the first subset of uplink MIMO layers corresponds to a first reception point and the second subset of the uplink MIMO layers corresponds to a second reception point that is different than the first reception point.

14. The one or more non-transitory computer-readable media of claim 12, wherein the first subset of MIMO layers or the first uplink power control parameter set is associated with one or more reference signals for propagation loss measurement, and the second subset of MIMO layers or the second uplink power control parameter set is associated with another one or more reference signals for propagation loss measurement; and
   the instructions further cause the network node to provide one or more downlink frames for transmission, the downlink frames comprising said one or more reference signals, and said other one or more reference signals for propagation loss measurements by the UE.

15. Baseband circuitry for use in a network node, the baseband circuitry configured to:
   associate a first uplink power control parameter set with a first beam associated with a first subset of a plurality of uplink Multiple Input Multiple Output (MIMO) layers to be transmitted by a user equipment (UE);
   associate a second uplink power control parameter set with a second beam associated with a second subset of the plurality of uplink MIMO layers to be transmitted by the UE;
   generate first uplink power control parameter set for transmission to the UE; and generate second uplink power control parameter set for transmission to the UE.

16. The baseband circuitry of claim 15, wherein the first subset of uplink MIMO layers corresponds to a first reception point and the second subset of the uplink MIMO layers corresponds to a second reception point that is different than the first reception point.

17. The baseband circuitry of claim 15, wherein the information corresponding to the uplink power control parameter set specifies one or more reference signals for propagation loss measurement.

18. The baseband circuitry of claim 15, wherein the first subset of MIMO layers or the first uplink power control parameter set is associated with one or more reference signals for propagation loss measurement, and the second subset of MIMO layers or the second uplink power control parameter set is associated with another one or more reference signals for propagation loss measurement; and
   the baseband circuitry further configured to generate one or more downlink frames for transmission, the downlink frames comprising said one or more reference signals, and said other one or more reference signals for propagation loss measurements by the UE.

* * * * *